United States Patent
Schreiber

(10) Patent No.: US 7,204,089 B2
(45) Date of Patent: Apr. 17, 2007

(54) ARRANGEMENT FOR THE COOLING OF THERMALLY HIGHLY LOADED COMPONENTS

(75) Inventor: Karl Schreiber, Mellensee (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 17 days.

(21) Appl. No.: 10/933,403

(22) Filed: Sep. 3, 2004

(65) Prior Publication Data

US 2005/0097891 A1    May 12, 2005

(30) Foreign Application Priority Data

Sep. 4, 2003    (DE) ................. 103 41 515

(51) Int. Cl.
F02C 1/00    (2006.01)
F02G 3/00    (2006.01)

(52) U.S. Cl. .......................... 60/752; 60/754

(58) Field of Classification Search .......... 60/752–760, 60/806
See application file for complete search history.

(56) References Cited

U.S. PATENT DOCUMENTS

| | | | |
|---|---|---|---|
| 4,262,487 A | | 4/1981 | Glenn |
| 5,113,648 A | | 5/1992 | Shekleton et al. |
| 5,184,455 A | | 2/1993 | Ewing et al. |
| 5,435,139 A | * | 7/1995 | Pidcock et al. ............ 60/757 |
| 5,605,046 A | | 2/1997 | Liang |
| 5,735,126 A | * | 4/1998 | Schulte-Werning .......... 60/732 |
| 5,941,076 A | * | 8/1999 | Sandelis .................. 60/752 |
| 6,241,469 B1 | | 6/2001 | Beeck et al. |
| 6,546,733 B2 | * | 4/2003 | North et al. ............... 60/772 |
| 6,826,913 B2 | * | 12/2004 | Wright ..................... 60/772 |
| 6,837,050 B2 | * | 1/2005 | Mandai et al. .............. 60/725 |
| 6,860,098 B2 | * | 3/2005 | Suenaga et al. ........... 60/39.23 |
| 6,981,358 B2 | * | 1/2006 | Bellucci et al. ........... 60/39.17 |
| 2003/0233831 A1 | * | 12/2003 | Suenaga et al. ............. 60/725 |
| 2005/0022531 A1 | * | 2/2005 | Burd ....................... 60/752 |
| 2005/0097890 A1 | * | 5/2005 | Ikeda et al. ................ 60/748 |

FOREIGN PATENT DOCUMENTS

| | | |
|---|---|---|
| DE | 1032622 | 6/1958 |
| DE | 19912701 | 9/2000 |
| EP | 0995880 | 4/2000 |
| GB | 780433 | 7/1957 |
| GB | 2348279 | 9/2000 |
| WO | 03006883 | 1/2003 |

OTHER PUBLICATIONS

European Search Report dated Nov. 18, 2004.
German Search Report dated Jun. 22, 2004.

* cited by examiner

Primary Examiner—William H. Rodriguez
(74) Attorney, Agent, or Firm—Timothy J. Klima

(57) ABSTRACT

An inexpensively manufacturable arrangement for the cooling of thermally highly loaded components, for example the combustion chamber of a gas turbine, comprises cavities (4) provided on the thermally loaded inner surface/air exit side (3) of the wall (1) of the component which are supplied with a cooling medium from the outer surface/air inlet side (5) via cooling air openings (6) and which are covered by a heat resistant wire mesh (7) of a certain permeability. The cavity, which acts as pressure accumulator, forms, in connection with the wire mesh, a uniform pressurized-air film (8) for the cooling and heat shielding of the wall surface.

20 Claims, 1 Drawing Sheet

ARRANGEMENT FOR THE COOLING OF THERMALLY HIGHLY LOADED COMPONENTS

This application claims priority to German Patent Application DE10341515.7 filed Sep. 4, 2003, the entirety of which is incorporated by reference herein.

BACKGROUND OF THE INVENTION

This invention relates to an arrangement for the cooling of thermally highly loaded components by means of a cooling medium, and in particular, the cooling of the combustion chamber of gas turbines, in which cooling air openings are provided in the component to be cooled which are supplied with cooling air at an air inlet side to form a cooling air film at the air outlet side of the component.

As is generally known, various components of a gas turbine, for example, the stator vanes and their platforms or the combustion chamber, are cooled with a multitude of minute cooling air openings or slots provided in the wall area, each with a cross-sectional area of approximately 1 mm$^2$, for example. The cooling air which is externally applied to the outer surface of the component also passes the respective wall area of the component via this multitude of cooling air openings to produce a cooling air film on the inner surface of the wall, thus directly shielding the wall against the hot combustion gases and keeping it below a temperature corresponding to the maximum thermal loadability of the respective component material.

The combustion chambers of aircraft engines include, as is generally known, individual rings which are made by non-cutting or cutting forming processes and joined by welding. The circumferential steps of a Z-shaped combustion chamber wall and the respective heat shield in the area of the burners contain several thousand minute cooling air openings which are produced by laser drilling. However, the effort for the laser drilling of the cooling air openings is largely uneconomical in relation to the total costs for the manufacture of the combustion chamber.

As is already known, combustion chambers for aircraft turbine engines are also made from individual segments produced by a casting process and joined by laser welding, but here as well, the fine cooling air openings must be expensively produced by lasering since it is impossible to incorporate their production even into the most advanced precision casting process.

DESCRIPTION OF THE INVENTION

In a broad aspect, the present invention provides an arrangement for the supply of thermally highly loaded components of gas turbines with cooling air which can be inexpensively produced with low manufacturing effort.

It is a particular object of the present invention to provide a solution to the above problems by an arrangement designed in accordance with the features described herein. Advantageous embodiments of the present invention will be apparent from the description below.

The general idea of the invention is the formation of at least one cavity in the wall surface to be cooled and shielded against hot gases which is open at the side to be cooled and which connects to cooling air openings for the supply of the required cooling air volume which originate at the opposite wall surface and are producible by casting, while the open side of the cavity is covered by a wire mesh of a certain permeability. The cavity here serves as a pressure accumulator for the continuously supplied cooling medium which uniformly flows off via the openings in the wire mesh, thus forming a smooth cooling air film at the wall surface to be cooled and shielded and serving for the self-cooling of the wire mesh.

The wire mesh, which is positively and/or conformably connected to the rim area of the cavity and whose permeability is selectable between 5 and 95 percent, can be made of a material with higher thermal roadability than the material of the component.

The cavity can be a groove-style channel with cooling air openings distributed over the length of the channel. Of course, several such cavities can be provided behind and/or parallel to each other.

While the cooling arrangement according to the present invention is preferably used for the cooling and heat shielding of combustion chambers of gas turbines, it is equally applicable to other components.

The advantages of the present invention are the cost-effective manufacturability also by casting, the evenness of the cooling air film produced, the possibility of varying the cooling air film by appropriate selection of the permeability of the wire mesh, and the isolation between the materials of the wire mesh and the component in connection with the high mechanical and thermal loadability resulting therefrom. The components are cost-effectively producible, in particular by casting, since the formation of the cooling air openings can be incorporated into the casting process.

DESCRIPTION OF THE DRAWING

An embodiment of the present invention is more fully described in the light of the accompanying drawing which shows a perspective sectional view of a part of a Z-shaped wall of the combustion chamber of a gas turbine.

DETAILED DESCRIPTION OF THE INVENTION

Figure 1:
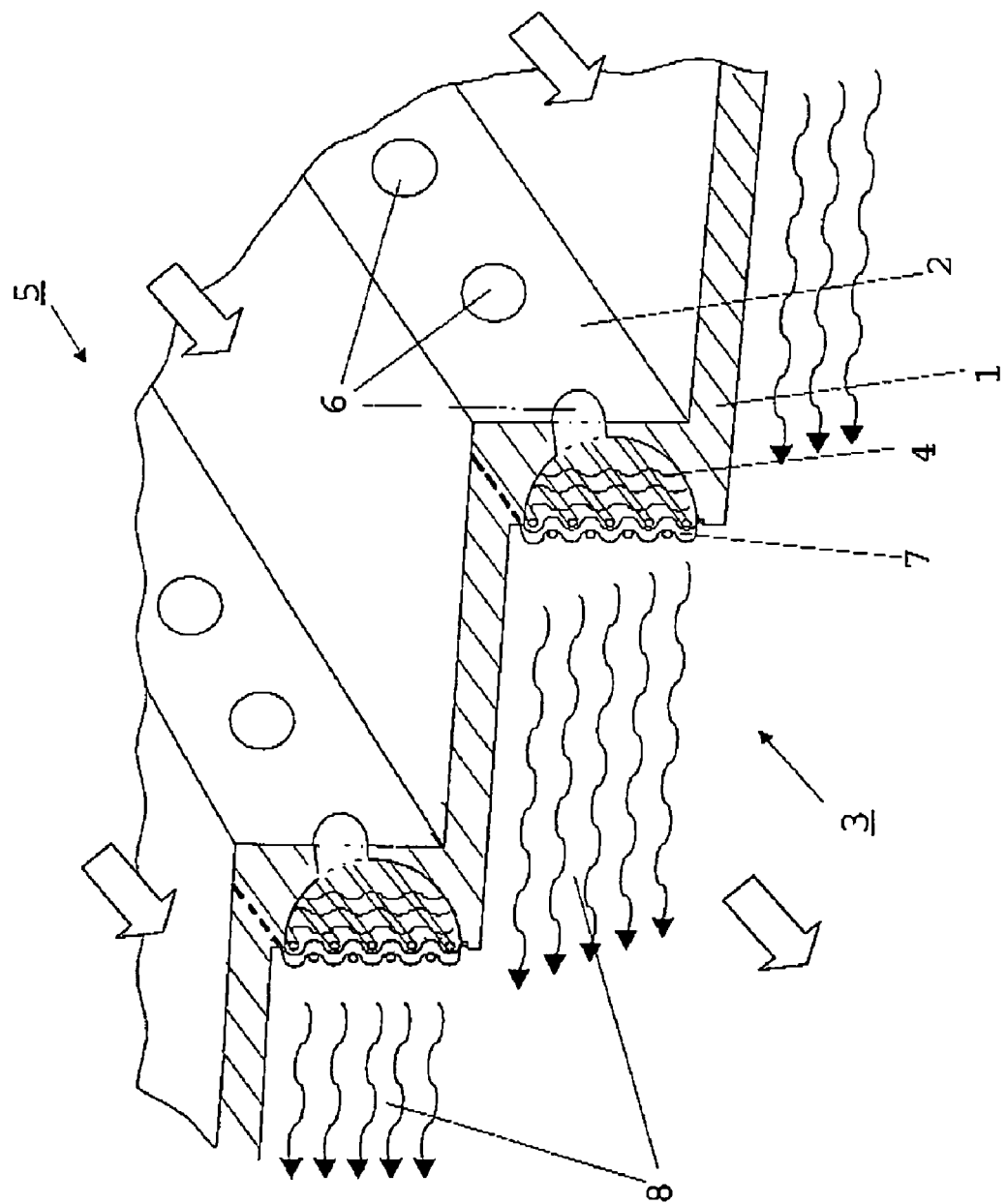

The wall 1 of a gas turbine combustion chamber segment, here produced by a casting process, features steps 2 at a defined distance which result from its Z-shaped cross section and whose inner surface, i.e. the air exit side 3, is provided with a cavity 4 in the form of a channel which is open at the air exit side 3. The cooling air openings 6, which originate at the outer surface of the wall or the air entry side 5, respectively, issue into the cavity 4, with the cross-sectional area of these cooling air openings 6 being sized such that, with a certain number of these cooling air openings 6, the air volume required for the cooling of the inner surfaces of the wall 1 can be provided and the cooling air openings 6 are producible during casting of the combustion chamber segments. The opening of the cavity 4 provided on the wall inner surface or the air exit side, respectively, is positively and/or conformably "closed" by a wire mesh 7 which has a certain permeability. While the casting material for the wall 1 of the combustion chamber must satisfy specific thermal and mechanical requirements, the wire mesh can be made of a different material with lower mechanical, but higher thermal loadability. For example, a chromium oxide former can be provided for the casting material and a thermally higher loadable aluminum oxide former can be provided for the wire mesh material.

The cavity 4 can be a groove-shaped channel which extends along an inner circumference of the combustion chamber and is formed into the inner surface of the wall 1, with the cooling air openings 6 being distributed along the channel length. Alternatively, the cavity 4 can include several sequential channels, with cooling air openings issuing into these channels, or can be of another construction. Further, multiple cavities 4 can be employed, including multiple channel-style cavities 4 arranged in parallel and one above the other on the wall 1. The component can be cast or a product of a non-cutting and/or cutting forming process. The cooling air openings are dimensioned such that they are manufacturable by such processes while being able to supply a required cooling air volume.

The flow of cooling air along the outer wall surface (air entry side 5) of the combustion chamber enters—via the cooling air openings 6—the cavity 4 in which a uniform pressure is build up. The wire mesh 7 produces an air film 8 which slowly flows along the inner surface (air exit side 3) of the combustion chamber, thus shielding against hot gases and cooling the combustion chamber wall.

The present invention is not confined to the application described above by way of an example of a combustion chamber of an aircraft turbine. Rather, the inventive concept, which comprises the formation of a cavity on the inner wall surface of the component to be shielded which serves as pressure accumulator and which is supplied via a small number of adequately dimensioned cooling air openings and which is covered by a wire mesh of a certain permeability, is also applicable to other components whose inner surface is to be shielded with any cooling medium film.

LIST OF REFERENCE NUMERALS

1 Wall (of a component to be cooled)
2 Step of 1
3 Air exit side
4 Cavity
5 Air entry side
6 Cooling air openings
7 Wire mesh
8 Cooling air film

What is claimed is:

1. An arrangement for the cooling of a thermally highly loaded component, in which cooling air openings are provided in the component to be cooled, which are supplied with cooling air at an air inlet side, to form a cooling air film at an air exit side of the component, wherein at least one cavity is provided at the air exit side which connects to at least one of the cooling air openings, the cooling air openings being dimensioned such that they are manufacturable by casting while being able to supply a required cooling air volume, the cavity, which is open at the air exit side, being covered with a gas-permeable Wire mesh made of heat-resistant material for the formation of the cooling air film.

2. An arrangement in accordance with claim 1, wherein the wire mesh is connected to a rim area of the open side of the cavity.

3. An arrangement in accordance with claim 1, wherein the component and the wire mesh are constructed of different materials, with the wire mesh material having a higher thermal loadability than the component material.

4. An arrangement in accordance with claim 1, wherein the permeability of the wire mesh is between 5 and 95%.

5. An arrangement in accordance with claim 4, wherein the permeability of the wire mesh is approximately 20%.

6. An arrangement in accordance with claim 1, wherein the component is a wall of a combustion chamber and the cavity is provided by a groove-shaped channel which extends along an inner circumference of the combustion chamber and is formed into an inner surface of the wall, with cooling air openings being distributed over the channel length.

7. An arrangement in accordance with claim 6, wherein multiple channel-style cavities are arranged in parallel and one above the other on the wall.

8. An arrangement in accordance with claim 7, wherein the cavities are formed into steps resulting from a Z-shape of the component to be cooled.

9. An arrangement in accordance with claim 1, wherein the cavity is provided by several sequential channels, with cooling air openings issuing into these channels.

10. An arrangement in accordance with claim 1, wherein the component is a product of at least one of a non-cutting and a cutting forming process.

11. An arrangement in accordance with claim 1, wherein the component, including the cooling air openings and the cavities, is a cast component.

12. An arrangement in accordance with claim 2, wherein the component and the wire mesh are constructed of different materials, with the wire mesh material having a higher thermal loadability than the component material.

13. An arrangement in accordance with claim 12, wherein the component is a wall of a combustion chamber and the cavity is provided by a groove-shaped channel which extends along an inner circumference of the combustion chamber and is formed into an inner surface of the wall, with cooling air openings being distributed over the channel length.

14. An arrangement in accordance with claim 13, wherein the permeability of the wire mesh is between 5 and 95%.

15. An arrangement in accordance with claim 14, wherein the permeability of the wire mesh is approximately 20%.

16. An arrangement for the coating of a thermally highly loaded component, comprising:
    a component wall,
    a plurality of cooling air openings provided in the component wail which are supplied with cooling air at an air inlet side of the component wall
    at least one cavity at an air exit side of the component wall which connects to at least one of the cooling air openings, the cavity being open at the air exit side,
    a gas-permeable wire mesh made of heat-resistant material covering the open side of the cavity for the formation of a cooling air film.

17. An arrangement in accordance with claim 16, wherein the cooling air openings are dimensioned such that they are manufacturable by casting while being able to supply a required cooling air volume.

18. An arrangement in accordance with claim 16, wherein the component and the wire mesh are constructed of different materials, with the wire mesh material having a higher thermal loadability than the component material.

19. An arrangement in accordance with claim 16, wherein the component is a wall of a combustion chamber and the cavity is provided by a groove-shaped channel which extends along an inner circumference of the combustion chamber and is formed into an inner surface of the wall, with cooling air openings being distributed over the channel length.

20. An arrangement in accordance with claim 16, wherein the permeability of the wire mesh is approximately 20%.

* * * * *